(12) United States Patent
Nazemi et al.

(10) Patent No.: US 8,958,501 B2
(45) Date of Patent: Feb. 17, 2015

(54) QUASI-DIGITAL RECEIVER FOR HIGH SPEED SER-DES

(71) Applicant: Broadcom Corporation, Irvine, CA (US)

(72) Inventors: Ali Nazemi, Aliso Viejo, CA (US); Mahmoud Reza Ahmadi, Huntington Beach, CA (US); Tamer Ali, Irvine, CA (US); Bo Zhang, Irvine, CA (US); Mohammed Abdul-Latif, Irvine, CA (US); Namik Kocaman, San Clemente, CA (US); Afshin Momtaz, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 58 days.

(21) Appl. No.: 13/720,623

(22) Filed: Dec. 19, 2012

(65) Prior Publication Data

US 2014/0146922 A1 May 29, 2014

Related U.S. Application Data

(60) Provisional application No. 61/729,949, filed on Nov. 26, 2012.

(51) Int. Cl.
*H03K 9/00* (2006.01)
*H04L 7/00* (2006.01)
*H04L 25/02* (2006.01)
*H04L 25/06* (2006.01)

(52) U.S. Cl.
CPC .............. *H04L 7/00* (2013.01); *H04L 25/0272* (2013.01); *H04L 25/0292* (2013.01); *H04L 25/0296* (2013.01); *H04L 25/06* (2013.01); *H04L 7/002* (2013.01)
USPC ......................................................... 375/316

(58) Field of Classification Search
CPC ....................................................... H04L 7/0025
USPC ........................................................... 375/316
See application file for complete search history.

(56) References Cited

U.S. PATENT DOCUMENTS

| | | | |
|---|---|---|---|
| 7,038,510 B2* | 5/2006 | Zhang | 327/158 |
| 2004/0141567 A1* | 7/2004 | Yang et al. | 375/287 |
| 2005/0184898 A1* | 8/2005 | Jiang et al. | 341/155 |
| 2006/0002497 A1* | 1/2006 | Zhang | 375/355 |
| 2006/0181319 A1* | 8/2006 | Zhang | 327/158 |
| 2009/0180548 A1* | 7/2009 | Jang | 375/240.25 |
| 2010/0046683 A1* | 2/2010 | Beukema et al. | 375/355 |
| 2010/0310024 A1* | 12/2010 | Agazzi et al. | 375/346 |
| 2011/0041008 A1* | 2/2011 | Lee et al. | 714/15 |
| 2011/0129010 A1* | 6/2011 | Yang | 375/232 |
| 2011/0228889 A1* | 9/2011 | Liu et al. | 375/376 |
| 2012/0192023 A1* | 7/2012 | Lee et al. | 714/746 |
| 2013/0142245 A1* | 6/2013 | Sindalovsky et al. | 375/233 |
| 2014/0097878 A1* | 4/2014 | Sindalovsky et al. | 327/156 |

* cited by examiner

*Primary Examiner* — Santiago Garcia
(74) *Attorney, Agent, or Firm* — Fiala & Weaver P.L.L.C.

(57) ABSTRACT

Techniques are described herein that provide an interface for receiving and deserializing digital bit stream(s). For instance, a receiver for a high-speed deserializer may include digital slicers, a digital phase interpolator, and a digital clock phase generator. The digital slicers may be configured to determine a digital value of a data input. The digital phase interpolator may be configured to generate an interpolated clock signal based on input clock signals that correspond to respective phases of a reference clock. The phase of the interpolated clock tracks the data input to the receiver through a clock recovery loop. The digital clock phase generator may be configured to generate output clock signals to control timing of the respective digital slicers. The receiver may further include a single digital eye monitor configured to monitor a data eye of the data input.

20 Claims, 7 Drawing Sheets

QUASI-DIGITAL RECEIVER FOR HIGH SPEED SER-DES

CROSS-REFERENCE TO RELATED APPLICATION(S)

This application claims the benefit of U.S. Provisional Application No. 61/729,949, filed Nov. 26, 2012, the entirety of which is incorporated by reference herein.

BACKGROUND

For high speed data transfer, a serializer/deserializer (SERDES) circuit is often used as an interface between an exterior of a chip and an interior of the chip. For instance, the SERDES circuit may convert parallel data to serial data for transmission over air waves or along a wire, for example, and to convert serial data to parallel data for processing by the chip. A SERDES transmitter includes circuitry for serializing parallel data, and a SERDES receiver includes circuitry for deserializing serial data.

Receivers used in high speed SERDES are typically implemented in current mode logic (CML) circuitry. The implementation of receiver components such as slicers and phase interpolators using CML technology often provides relatively high performance (e.g., jitter tolerance, power supply sensitivity, input amplitude sensitivity) as compared to other technologies. However, implementation of such components in CML technology results in relatively high power consumption and loss of chip area due to the size of the components in the SERDES circuit when implemented using CML technology. Incorporation of additional functionalities, such as eye monitoring, increases power consumption and chip area usage. Eye monitors monitor a data eye of a received bit stream. Conventional SERDES receivers that have eye monitoring functionality typically include two eye monitors. One eye monitor monitors output of a data slicer and the other eye monitor monitors output of a data bar slicer. The data slicer and the data bar slicer are commonly implemented as strong arm slicers and CML slicers. Digital components such as complementary metal oxide semiconductor (CMOS) components utilize digital switches which typically consume less power and less chip area as compared to their analog counterparts. However, such digital components often are slower than their analog counterparts.

BRIEF SUMMARY

A system and/or method for providing an interface for receiving and deserializing digital bit stream(s), substantially as shown in and/or described in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the disclosed technologies and, together with the description, further serve to explain the principles involved and to enable a person skilled in the relevant art(s) to make and use the disclosed technologies.

Figure 1:
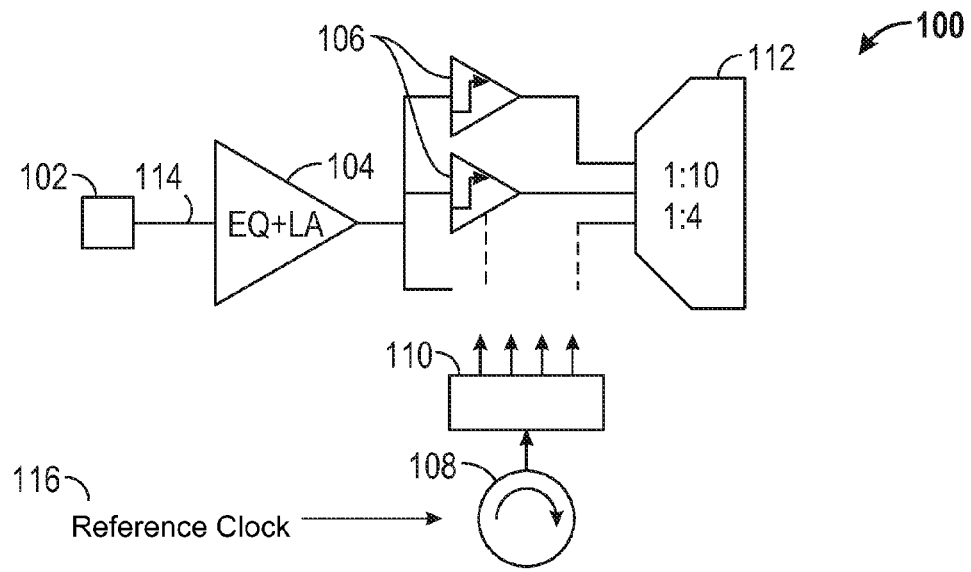
FIG. 1 is a block diagram of an example receiver according to an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate example embodiments of the disclosed technologies. However, the scope of the disclosed technologies is not limited to these embodiments, but is instead defined by the appended claims. Thus, embodiments beyond those shown in the accompanying drawings, such as modified versions of the illustrated embodiments, may nevertheless be encompassed by the disclosed technologies.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Methods, systems, and apparatuses for a quasi-digital receiver for high speed SERDES are provided. Aside from a front end buffer that performs equalization and amplification of a received data signal, the receiver may be implemented entirely in digital (e.g., complementary metal-oxide-semiconductor (CMOS) or silicon on insulator (SOI)) technology, yet may be capable of performing deserialization for a broad range of high data rates.

An example receiver for a high-speed deserializer is described. The receiver includes digital slicers, a digital phase interpolator, and a digital clock phase generator. The digital slicers are configured to determine a digital value of a data input. The digital phase interpolator is configured to generate an interpolated clock signal based on input clock signals that correspond to respective phases of a reference clock. The digital clock phase generator is configured to generate output clock signals to control timing of the respective digital slicers. The output clock signals are based on respective phases of the interpolated clock signal.

An example quasi-digital receiver for a high-speed deserializer is described. The quasi-digital receiver includes an analogue front end, digital slicers, a digital de-multiplexer (DEMUX), one digital eye monitor, a digital clock generator, and a digital phase interpolator. The analogue front end is configured to amplify and equalize a data input signal. The digital slicers are configured to determine a value of each bit of the data input signal. The digital de-multiplexor is configured to demultiplex an output of each of the digital slicers. The digital eye monitor is slaved to one of the digital slicers at a time. The digital eye monitor is configured to monitor a data eye of the data input signal. The digital clock generator is configured to generate output clock signals to control timing of the respective digital slicers. The digital phase interpolator is configured to generate an interpolated clock signal upon which the output clock signals are based.

An example method of providing an interface for receiving and deserializing digital bit stream(s) is described. The method includes equalizing and amplifying a data input signal that includes bits by an analog frontend circuit to provide a processed data input signal. First, second, third, and fourth clock signals are generated by a digital clock phase generator circuit. The first clock signal has a first phase. The second clock signal has a second phase that is 90 degrees greater than the first phase. The third clock signal has a third phase that is 180 degrees greater than the first phase. The fourth clock signal has a fourth phase that is 270 degrees greater than the first phase. The data input signal is sampled by a digital data slicer based on the first clock signal to provide a first determined value for each bit of the data input signal. The data input signal is sampled by a digital data bar slicer based on the third clock signal to provide a second determined value for each bit of the data input signal. The first clock signal controls timing of the digital data slicer. The third clock controls timing of the digital data bar slicer.

II. Example Embodiments

The example embodiments described herein are provided for illustrative purposes, and are not limiting. In embodiments, a receiver for a high-speed deserializer is provided. The examples described herein may be adapted to any type of digital technology. Further structural and operational embodiments, including modifications/alterations, will become apparent to persons skilled in the relevant art(s) from the teachings herein.

A receiver for a high speed deserializer as disclosed herein serves as an interface between an exterior of a chip and an interior of the chip. Such receiver may consume relatively low power and relatively low chip area. For instance, the receiver may be essentially transparent for use in applications such as wireless communications, networking, and disc drive chips, for example. In a receiver as disclosed herein, all circuit components that follow an analog front end equalizer and amplifier may be implemented using digital technology, such as complementary metal-oxide-semiconductor (CMOS) or silicon on insulator (SOI) technologies. The use of digital circuit components may provide a cost savings in power usage and area as compared to the use of CML technologies because digital circuits often use substantially less power and chip area than their analog counterparts. Furthermore, the use of digital circuitry in a receiver for a high speed deserializer as disclosed herein allows for improved scalability across processes as compared to the use of analog circuitry. In addition, the receiver may be capable of providing relatively high speed deserialization despite the use of digital circuit components. For example, in some embodiments, deserialization at a frequency up to 11.5 Gb per second or greater may be possible. Moreover, the receiver may be capable of processing signals having a range of data rates from 8 GHz to 12 GHz, for example.

FIG. 1 is a block diagram of an example receiver 100 according to an embodiment. As shown in FIG. 1, receiver 100 includes an input node 102, an analog front end 104, a plurality of digital slicers 106, a digital phase interpolator 108, a digital clock phase generator 110, and a digital demultiplexor 112. A data input signal 114 (e.g., a digital bit stream) is received at input node 102.

Analog front end 104 may include a continuous time linear equalizer (EQ) and a limiting amplifier (LA). Analog front end 104 receives the data input signal 114 from input node 102 and equalizes and amplifies the data input signal 114. Digital slicers 106 receive the data input signal 114 from analog front end 104. Digital slicers 106 determine a value (e.g., either "0" or "1") of each bit of the data input signal 114. Although two digital slicers 106 are shown in FIG. 1 for illustrative purposes, receiver 100 may include any suitable number of digital slicers. For instance, digital slicers 106 may include a data slicer, a data bar slicer, a zero slicer, and a zero bar slicer. The zero slicer and the zero bar slicer may detect edges of a clock signal that may be transmitted with the data signal. The zero slicer and the zero bar slicer are not pertinent to the following discussion of FIG. 1. Therefore, the following discussion will focus on the data slicer and the data bar slicer without reference to the zero slicer and the zero bar slicer.

Digital phase interpolator 108 generates an interpolated clock signal for use in generating clock signals for the digital slicers 106. For instance, digital phase interpolator 108 may generate the interpolated clock signal based on input reference clock signals in order to track the phase of the data input to the receiver through a clock and data recovery loop. An example implementation of digital phase interpolator 108 is described in greater detail below with reference to FIG. 3.

Digital clock phase generator 110 uses the interpolated clock signal that is generated by digital phase interpolator 108 to generate first, second, third, and fourth clock signals having phases spaced evenly between 0 and 360 degrees. Each of the first, second, third, and fourth clock signals is used to control a sampling rate of a respective digital slicer 106. An example implementation of digital clock phase generator 110 is described in greater detail below with reference to FIG. 4.

Digital demultiplexor 112 is configured to de-multiplex output signals of the respective digital slicers 106 that are to represent the value of each bit of the data input signal 114. Receiver 100 according to embodiments described herein may be capable of operating over a wide range of data input frequencies (e.g., bit rates). Digital demultiplexor 112 is programmable between the demuxing rate of 1:10 and 1:4 for illustrative purposes, though the scope of the example embodiments is not limited in this respect. It will be recognized that digital demultiplexor 114 may be programmable over any suitable range of demuxing rates.

As noted above, in an embodiment, receiver 100 provides high speed deserialization of a data input signal using, with the exception of an analog front end amplifier and equalizer, fully digital circuit components. The elements of receiver 100 in FIG. 1 may be implemented in various ways. Implementations of elements of receiver 100 of FIG. 1 are described below in greater detail with respect to FIGS. 2-5, which show elements of receiver 100 according to various example embodiments. It should be noted that like reference characters refer to like elements throughout.

Figure 2:
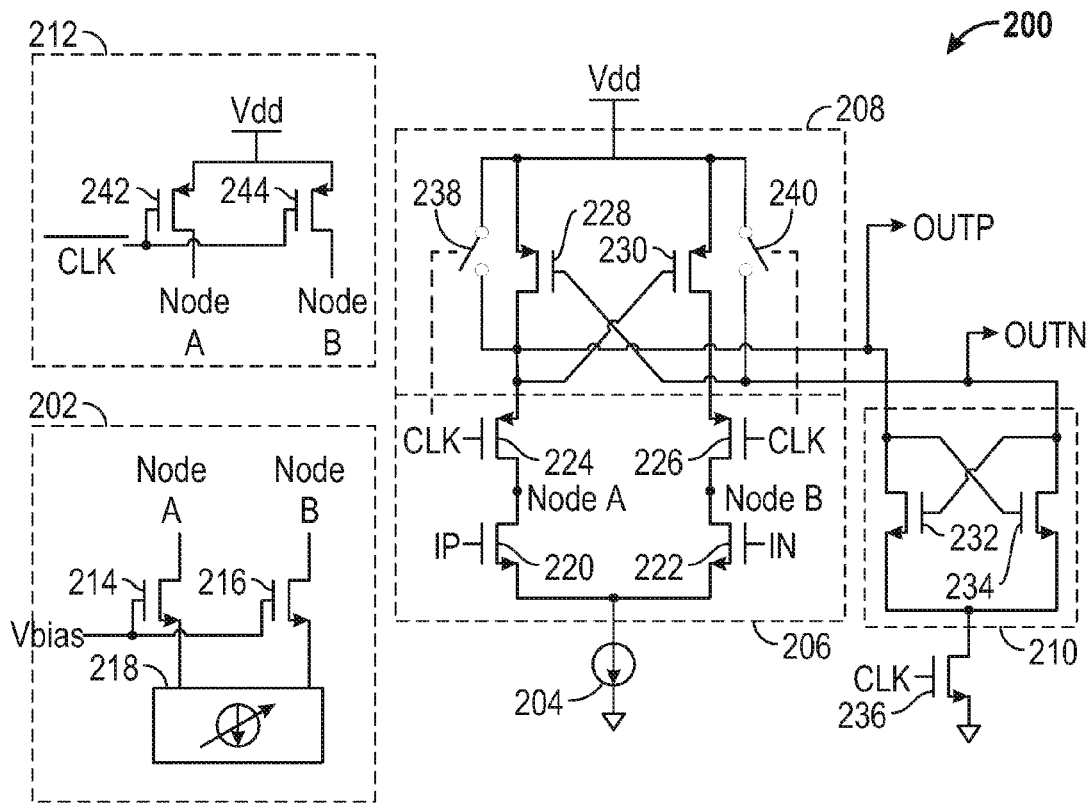
FIG. 2 is a block diagram of an example implementation of a digital slicer shown in FIG. 1 according to an embodiment.

FIG. 2 is a block diagram of an example digital slicer 200, which is an example implementation of digital slicer shown in FIG. 1, according to an embodiment. It should be noted that nodes A and B shown in elements 202 and 212 of FIG. 2 are the same nodes A and B shown in element 206 of FIG. 2. Elements of the circuits shown in FIG. 2 that are connected to node A and/or node B may be considered as being connected to other elements of FIG. 2 that are also connected to node A and/or node B, except where otherwise noted. It should be noted that the example digital slicer 200 shown in FIG. 2 and the following discussion thereof applies equally regardless whether digital slicer 200 is a data slicer, a data bar slicer, a zero slicer, or a zero bar slicer. Note that digital slicer 200 is provided for purposes of illustration, and is not intended to be limiting. In further embodiments, digital slicer 200 may be implemented in other ways, as would be known to persons skilled in the relevant art(s).

Referring to FIG. 2, digital slicer 200 includes a digital offset calibration circuit 202, a proportional to absolute temperature (PTAT) current source 204, a differential amplifier 206, a first latch 208, a second latch 210, a connection circuit 212, and an NMOS transistor 236. Digital offset calibration circuit 202 is a digital to analog converter (DAC). Digital offset calibration circuit 202 includes a pair of cascode connected NMOS transistors 214 and 216 and a programmable current source 218. Cascode connected transistors 214 and 216 have gates commonly coupled to a bias voltage Vbias and sources commonly coupled to programmable current source 218. Transistor 214 has a drain coupled to node A of digital slicer 200, and transistor 214 has a drain coupled to node B of digital slicer 200. Digital offset calibration circuit 202 is configured to provide an offset calibration input to differential amplifier 206 to compensate for an offset associated with digital slicer 200. The offset calibration input provided by digital offset calibration circuit 202 may be an offset current, for example. An offset current is sensitive to temperature changes. Thus, digital slicer 200 includes PTAT current supply 204.

PTAT current supply 204 is configured to provide a PTAT current to differential amplifier 206 to compensate for a temperature dependency associated with the offset calibration input. PTAT current supply 204 is a current supply in which current increases with temperature to compensate for a change in transconductance (gm) of transistor(s) due to an increase in temperature. Once an offset input for the circuit has been calibrated, the use of a PTAT current decreases the offset sensitivity to temperature. The PTAT current increases as temperature increases. Therefore, by using PTAT current supply 204, stable transconductance can be maintained at the input to digital slicer 200. A positive terminal of PTAT current supply 204 is coupled to differential amplifier 206, and a negative terminal of PTAT current supply 204 is coupled to a ground potential.

Differential amplifier 206 includes differentially connected NMOS transistors 220 and 222 and PMOS transistors 224 and 226. A drain of NMOS transistor 220 is coupled to node A, and a source of NMOS transistor is coupled to the positive terminal of PTAT current supply 204. A drain of NMOS transistor 222 is coupled to node B, and a source of NMOS transistor 222 is coupled to the positive terminal of PTAT current supply 204. Differential amplifier 206 is configured to provide a differential signal based on a data input signal, such as, for example, data input signal 114 from analog front end 104 of FIG. 1. In the embodiment of FIG. 2, the data input signal is a differential data input signal, which is received across gates of the respective NMOS transistors 220 and 222.

PMOS transistor 224 is used as a sampling switch. A source of PMOS transistor 224 is coupled to first latch 208, and a drain of PMOS transistor 224 is coupled to node A. A source of PMOS transistor 226 is coupled to first latch 208, and a drain of PMOS transistor 226 is coupled to node B. A clock signal, labeled "CLK", is received at gates of PMOS transistors 224 and 226.

First latch 208 includes PMOS transistors 228 and 230 and sampling switches 238 and 240. First latch 208 is coupled to differential amplifier 206 and is configured to receive a differential signal that is based on the data input signal from differential amplifier 206. For instance, the differential signal may be the data input signal. A source of PMOS transistor 228 is coupled to a first terminal of sampling switch 238, a first terminal of sampling switch 240, a source of PMOS transistor 230, and a positive reference potential, labeled "Vdd". A drain of PMOS transistor 228 is coupled to a second terminal of sampling switch 238, a gate of PMOS transistor 230, a source of PMOS transistor 224, and second latch 210. A source of PMOS transistor 230 is coupled to the first terminal of sampling switch 238, the first terminal of sampling switch 240, the source of PMOS transistor 2280, and the positive reference potential. A drain of PMOS transistor 230 is coupled to a source of PMOS transistor 226.

Second latch 210 includes NMOS transistors 232 and 234. Second latch 210 is configured to receive an output of first latch 208. A drain of NMOS transistor 232 is coupled to the drain of PMOS transistor 228, the second terminal of sampling switch 238, the source of PMOS transistor 224, and the gate of PMOS transistor 230. A source of NMOS transistor 232 is coupled to a drain of NMOS transistor 236. A gate of NMOS transistor 232 is coupled to a drain of NMOS transistor 234. A drain of NMOS transistor 234 is coupled to the gate of PMOS transistor 228. A source of NMOS transistor 234 is coupled to the drain of NMOS transistor 236. A gate of NMOS transistor 234 is coupled to the drain of NMOS transistor 232.

First and second latches 208 and 210 collaboratively regenerate the differential signal and provide a data output. The output is provided as a differential data output across the drains of NMOS transistors 232 and 234 in the embodiment of FIG. 4, as indicated by the labels "OUTP" and "OUTN". Although sampling switches are shown to be included in first latch 208, it will be recognized that first and second latches 208 and 210 share sampling switches 238 and 240.

A drain of NMOS transistor 236 is coupled to the sources of NMOS transistors 232 and 234. A source of NMOS transistor 236 is coupled to the ground potential. The click signal "CLK" is received at a gate of NMOS transistor 236.

Connection circuit 212 includes PMOS transistors 242 and 244. Gates of PMOS transistors 242 and 244 are commonly coupled to a clock bar signal, labeled "!CLK", which is the inverse of the clock signal "CLK". Sources of PMOS transistors 242 and 244 are commonly coupled to the positive reference potential. Drains of PMOS transistors 242 and 244 are coupled to node A and node B, respectively. Connection circuit 212 is configured to connect differential amplifier 206 to the positive reference potential in response to first latch 208 being in an off state. Thus, because there is still a path for the current even when first latch 208 is turned off, high speed operation of the slicer may be maintained.

Operation of digital slicer 200 will now be described in further detail. A data input signal (e.g., data input signal 114 from analog front end 104 of FIG. 1) is received by differential amplifier 206 as differential input signals IP and N. Positive differential input IP is applied to the gate of NMOS transistor 220 (non-inverting input), and negative differential input IN is applied to the gate of NMOS transistor 222 (inverting input). A clock signal CLK is applied to the gates of PMOS transistors 224 and 226, to switches 238 and 240, and to the gate of NMOS transistor 236. When digital slicer 200 is initially turned on (i.e., during a first "phase"), digital offset calibration circuit 202 provides a relatively small current to differential amplifier 206. The first phase is a tracking phase in which clock signal CLK is low, PMOS transistors 228 and 230 of first latch 208 are on, and connection circuit 212 is off. Therefore, during the first phase, data input signals IP and IN are written to first latch 208. During a second phase, clock signal CLK is high and PMOS transistors 228 and 230 of first latch 208 are off, so that NMOS transistors 220 and 222 are disconnected from first latch 208. Because clock signal CLK is high, first and second latches 208 and 210 start making a decision as to a digital value of the data input based on a polarity of the differential signal represented by a difference between the data input signals IP and IN, which were written during the first phase. However, although clock signal CLK is high and PMOS transistors 228 and 230 of first latch 208 are off, thereby disconnecting NMOS transistors 220 and 222 from first latch 208, connection circuit 212, which receives the inverse of clock signal CLK, provides a connection between nodes A and B and the reference voltage Vdd. Thus, connection circuit 212 provides a path for current to flow, thereby preventing digital slicer 200 from operating too slowly.

Figure 3:
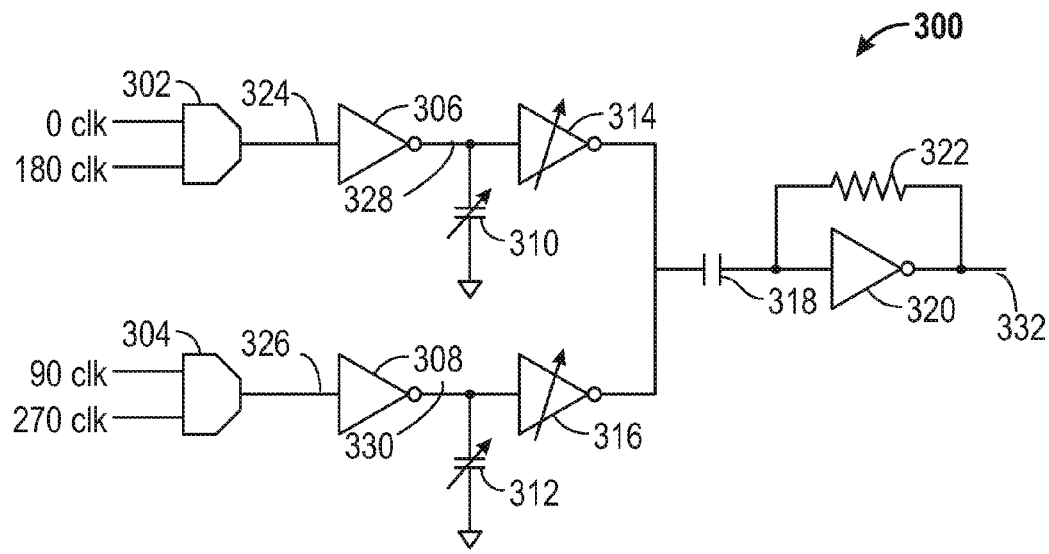
FIG. 3 is a block diagram of an example implementation of a digital phase interpolator shown in FIG. 1 according to an embodiment.

A circuit for generating an interpolated clock signal may be implemented in any of a variety of ways. For instance, FIG. 3 is a block diagram of an example digital phase interpolator 300, which is an example implementation of a digital phase interpolator 108 shown in FIG. 1, according to an embodiment. Note that digital phase interpolator 300 is provided for purposes of illustration, and is not intended to be limiting. In further embodiments, digital phase interpolator 300 may be implemented in other ways, as would be known to persons skilled in the relevant art(s).

For instance, digital phase interpolator 108 may generate the interpolated clock signal based on input reference clock signals in order to track the phase of the data input to the receiver through a clock and data recovery loop. Referring to FIG. 3, digital phase interpolator 300 is configured to generate an interpolated clock signal 332 based on input reference clock signals that track the phase of the data input to the receiver through a clock and data recovery loop. The phases of the input reference clock signals include a 0 degree phase, a 90 degree phase, a 180 degree phase, and a 270 degree phase. Digital phase interpolator 300 includes first and second multiplexors 302 and 304, first and second inverters 306 and 308, first and second programmable slew rate control capacitors 310 and 312, first and second non-linearly weighted adder unit cells 314 and 316 (a.k.a. "first and second adder unit cells 314 and 316"), a capacitor 318, a resistor 322, and an inverter 320.

First multiplexor 302 is configured to multiplex the input reference clock signal that corresponds to the 0 degree phase and the input reference clock signal that corresponds to the 180 degree phase to provide a first multiplexed signal 324. Second multiplexor 304 is configured to multiplex the input reference clock signal that corresponds to the 90 degree phase and the input reference clock signal that corresponds to the 270 degree phase to provide a second multiplexed signal 326. First inverter 306 and second inverter 308 are configured to invert first multiplexed signal 324 and second multiplexed signal 326, respectively, to provide a first inverted signal 328 and a second inverted signal 330, respectively.

First programmable slew rate control capacitor 310 is configured to control a slew rate of first inverted signal 328, and second programmable slew rate control capacitor 312 is configured to control a slew rate of second inverted signal 330. First and second programmable slew rate control capacitors 310 and 312 are configured to enable receiver 100 to operate at a variety of frequencies of data input signal 114.

First non-linearly weighted adder unit cells 314 and second non-linearly weighted adder unit cells 316 are coupled to first programmable slew rate control capacitor 310 and second programmable slew rate control capacitor 312, respectively. First non-linearly weighted adder unit cells 314 and second non-linearly weighted adder unit cells 316 are configured to reduce an integral non-linearity and a differential non-linearity associated with interpolated clock signal 332. A weighting of first and second adder unit cells 314 and 316 is changed over time to turn on and off adder unit cells 314 and 316. Turning on and off first and second adder unit cells 314 and 316 changes a step of interpolation by changing an amount of each of the first inverted signal 328 and the second inverted signal 330 that is provided to capacitor 318. Although not shown in FIG. 3, first and second non-linearly weighted adder unit cells 314 and 316 may include a plurality of switches. Sizes of the switches may be different for each step of the interpolation. Switches may be turned on or turned off depending on the step of the interpolation. Using different switch sizes for different steps provides non-linearity in the weighting of adder unit cells 314 and 316 and provides for a more linear curve of interpolated clock signal 332.

Returning to FIG. 3, capacitor 318, resistor 322 and inverter 320 form an amplifier. Phases are added to generate interpolated clock signal 332, and a magnitude of interpolated clock signal 332 is relatively low. Accordingly, the amplifier formed by capacitor 318, resistor 322, and inverter 320 is used to amplify interpolated clock signal 332. Capacitor 318 acts as a high pass filter and is configured to reduce a DC offset associated with interpolated clock signal 332 and to reduce duty cycle distortion associated with interpolated clock signal 332.

Figure 4:
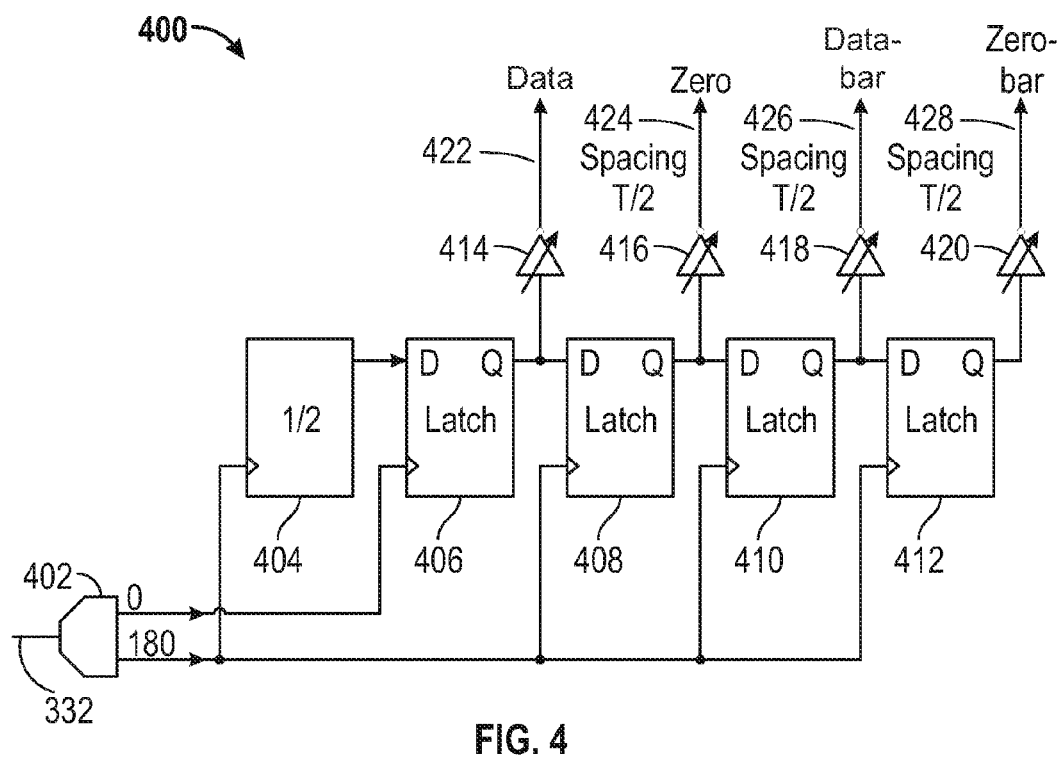
FIG. 4 is a block diagram of an example implementation of a digital clock phase generator shown in FIG. 1 according to an embodiment.

A circuit for generating clock signals of differing phases may be implemented in any of a variety of ways. For instance, FIG. 4 is a block diagram of an example digital clock phase generator 400, which is an example implementation of a digital clock phase generator 110 shown in FIG. 1, according to an embodiment. Note that digital clock phase generator 400 is provided for purposes of illustration, and is not intended to be limiting. In further embodiments, digital clock phase generator 400 may be implemented in other ways, as would be known to persons skilled in the relevant art(s). Digital clock phase generator 400 shown in FIG. 4 is described as follows.

Digital clock phase generator 400 is configured to generate first, second, third, and fourth output clock signals 422, 424, 426, and 428 for controlling a sampling rate of digital slicers 106 of FIG. 1. First, second, third, and fourth output clock signals 422, 424, 426, and 428 are based on first, second, third, and fourth phases of interpolated clock signal 332, respectively. As described above, digital slicers 106 of FIG. 1 include a data slicer and a data bar slicer configured to determine a digital value of data input 114, and an edge slicer and an edge bar slicer configured to detect edge(s) of data input 114, or an edge of a clock transmitted with data input 114. First output clock signal 422 is based on a first phase of interpolated clock signal 332 to control timing of a data slicer. Second output clock signal 424 is based on a second phase of interpolated clock signal 332 that is 90 degrees greater than the first phase to control timing of an edge slicer. Third output clock signal 426 is based on a third phase of interpolated clock signal 332 that is 180 degrees greater than the first phase to control timing of a data bar slicer. Fourth output clock signal 428 is based on a fourth phase of interpolated clock signal 332 that is 270 degrees greater than the first phase to control timing of an edge bar slicer. In some embodiments, clock signal CLK of digital slicer 200 of FIG. 2 may be generated and implemented in a similar manner as any of first, second, third, and fourth output clock signals 422, 424, 426, and 428 shown in FIG. 4.

As shown in FIG. 4, digital clock phase generator 400 includes a multiplexor 402, a delay component 404, a first latch 406, a second latch 408, a third latch 410, a fourth latch 412, a first phase adjustment circuit 414, a second phase adjustment circuit 416, a third phase adjustment circuit 418, and a fourth phase adjustment circuit 420. Multiplexor 402 is configured to provide a differential clock input based on the interpolated clock signal 332. The differential clock input is applied to delay component 404 and first, second, third, and fourth latches 406, 408, 410, and 412 as shown in FIG. 4. First, second, third, and fourth latches 406, 408, 410, and 412 are configured to generate first, second, third, and fourth output clock signals 422, 424, 426, and 428 having T/2 spacing there between. For example, if the differential clock input has a frequency of 10 GHz, first, second, third, and fourth output clock signals 422, 424, 426, and 428 will have a frequency of 5 GHz and be spaced by T/2, which is 50 ps. First output clock signal 422 is based on a phase of 0 degrees of the interpolated clock signal 332. Second output clock signal 424 is based on a phase of 90 degrees of the interpolated clock signal 332. Third output clock signal 426 is based on a phase of 180 degrees of the interpolated clock signal 332. Fourth output clock signal 428 is based on a phase of 270 degrees of the interpolated clock signal 332. First, second, third, and fourth phase adjustment circuits 414, 416, 418, and 420 are configured to compensate for fixed phase error associated with the respective first, second, third, and fourth output clock signals 422, 424, 426, and 428.

Figure 5:
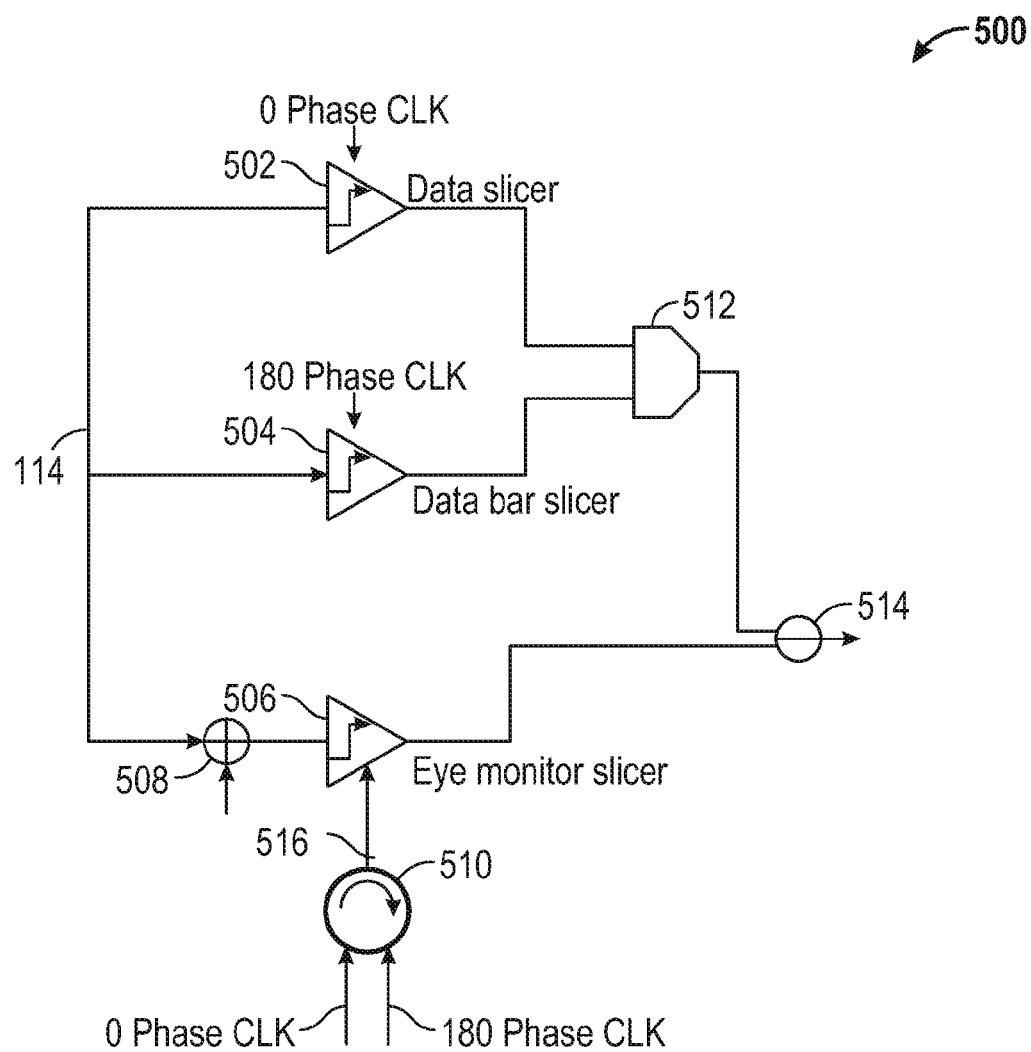
FIG. 5 is a block diagram of an example receiver that incorporates a single digital eye monitor slicer according to an embodiment.

A circuit for monitoring a data eye of a data input may be implemented in any of a variety of ways. For instance, FIG. 5 shows some components of a receiver 500 incorporating a digital eye monitor slicer 506 according to an embodiment. In some embodiments, receiver 100 shown in FIG. 1 may be implemented in a similar manner as receiver 500 shown in FIG. 5. Note that receiver 500 is provided for purposes of illustration, and is not intended to be limiting. In further embodiments, receiver 500 may be implemented in other ways, as would be known to persons skilled in the relevant art(s).

As shown in FIG. 5, components of a receiver 500 include a digital data slicer 502, a digital data bar slicer 504, eye monitor slicer 506, a voltage adder 508, a digital phase interpolator 510, a multiplexor 512, and a comparator 514. Digital data slicer 502, digital data bar slicer 504, and eye monitor slicer 506 may have a same configuration as digital slicer 200 shown in FIG. 2, though the scope of the example embodiments is not limited in this respect. Accordingly, a detailed description of components of digital data slicer 502, digital data bar slicer 504, and eye monitor slicer 506 will not be repeated here. In some embodiments, digital slicers 106 of FIG. 1 may be implemented in a similar manner as digital data slicer 502 and digital data bar slicer 504 of FIG. 5.

Digital phase interpolator 510 generates an interpolated clock signal for digital eye monitor slicer 506. In some embodiments, digital eye monitor slicer 506 does not share digital phase interpolator 108 of FIG. 1 with digital slicers 106. Rather, digital eye monitor slicer 506 has its own phase interpolator 510 for generating its own clock signal 516. Digital phase interpolator 510 interpolates signals that correspond to phases of 0 degrees and 180 degrees, respectively, of a reference input signal.

As shown in FIG. 5, one digital eye monitor slicer 506 is used to monitor a data eye of data received by digital data slicer 502 and digital data bar slicer 504. Similarly, in some embodiments, a single digital eye monitor slicer (e.g., digital eye monitor slicer 506 of FIG. 5) may be used in receiver 100 of FIG. 1 to monitor a data eye of data received by a digital data slicer and a digital data bar slicer in digital slicers 106. A data input signal (e.g., data input signal 114 of FIG. 1) is received by digital data slicer 502, digital data bar slicer 504, and eye monitor slicer 506. Digital eye monitor slicer 506 is configured to monitor a data eye associated with data input 114. Digital eye monitor slicer 506 is time-multiplexed. That is to say, digital eye monitor slicer 506 is selectively controllable using its own clock signal 516, which selectively has a same phase as first output clock signal 422 of FIG. 4 for controlling timing of a digital data slicer (e.g., digital data slicer 502) or a same phase as third output clock signal 426 of FIG. 4 for controlling timing of a digital data bar slicer (e.g., digital data bar slicer 504). When clock signal 516 is selected to have a same phase as first output clock signal 422 of FIG. 4, digital eye monitor slicer is slaved to digital data slicer 502. When clock signal 516 is selected to have a same phase as third output clock signal 424 of FIG. 4, digital eye monitor slicer 506 is slaved to digital data bar slicer 504. Digital eye monitor slicer 506 therefore selectively monitors output of digital data slicer 502 or digital data bar slicer 504. Accordingly, digital eye monitor slicer 506 under samples data input signal 114 at one-half a rate at which digital data slicer 502 and digital data bar slicer 504 operate.

FIGS. 6-11 show flowcharts 600, 700, 800, 900, 1000, and 1100, which are described below with continued reference to receiver 100, digital slicer 200, digital phase interpolator 300, digital clock phase generator 400, and receiver 500 shown in respective FIGS. 1-5 for illustrative purposes and are not intended to be limiting. Other structural and operational embodiments will be apparent to persons skilled in the relevant art(s) based on the following discussion.

Figure 6:
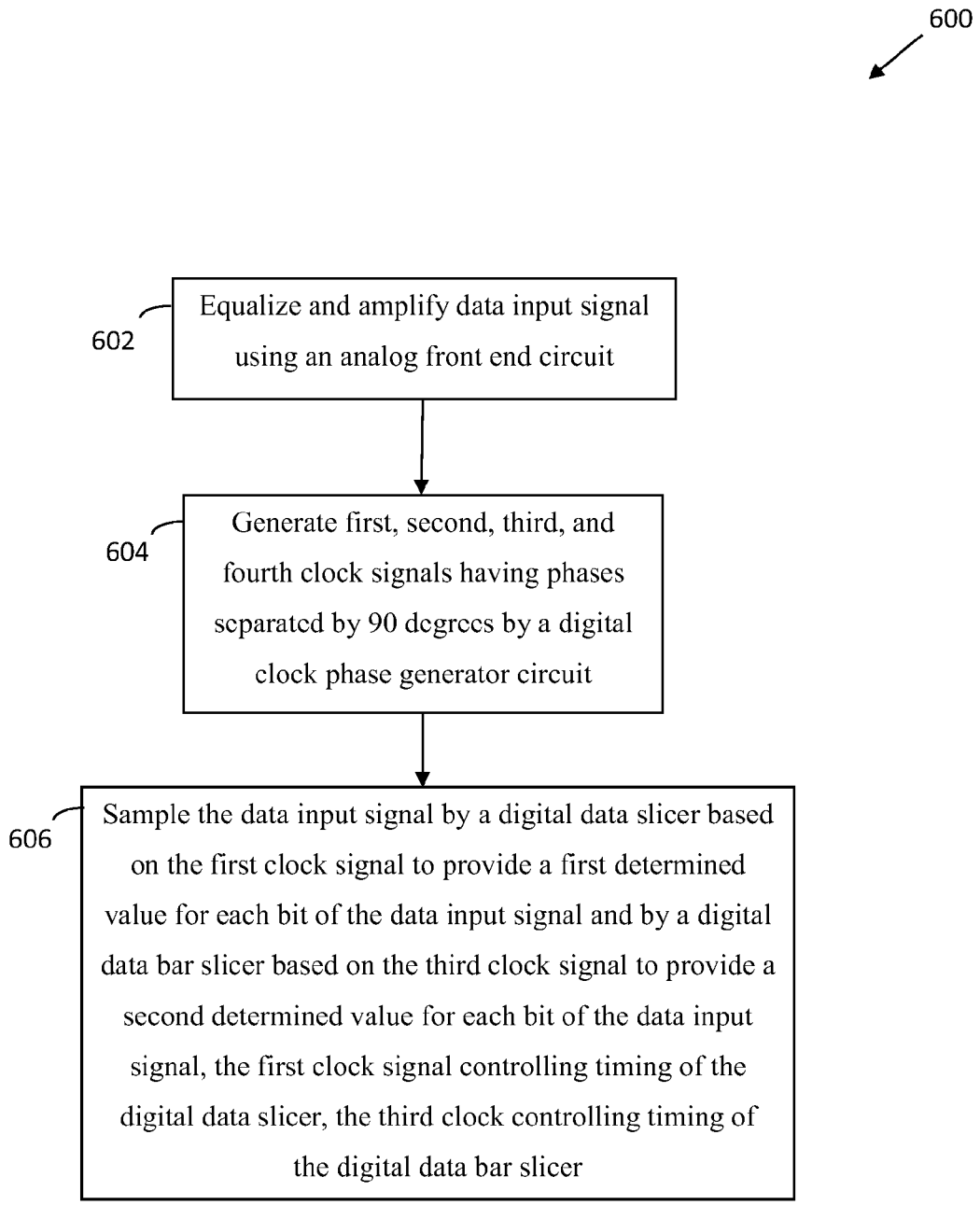
FIGS. 6 and 7 show flowcharts of example methods of providing an interface for receiving and deserializing digital bit stream(s) according to embodiments.
Figure 7:
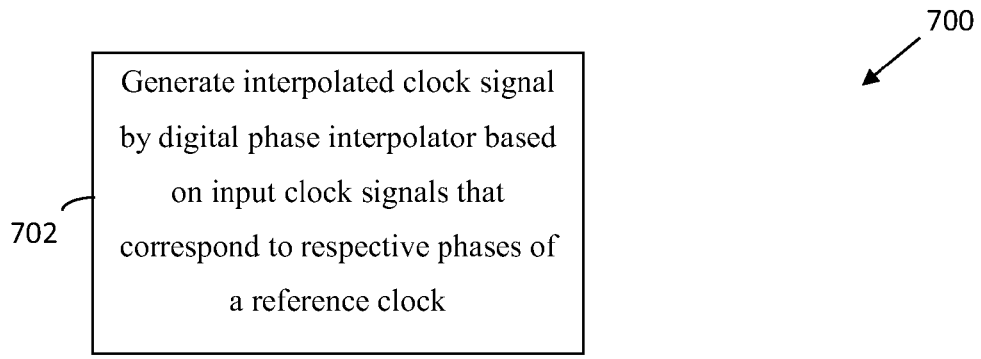

FIGS. 6 and 7 show flowcharts 600 and 700 of example methods of providing an interface for receiving and deserializing digital bit stream(s) according to embodiments. As shown in FIG. 6, flowchart 600 begins with step 602. In step 602, a data input signal is equalized and amplified by an analog frontend circuit to provide a processed data input signal. The data input signal includes multiple bits. For example, analog frontend circuit 104 of FIG. 4 may equalize and amplify data input signal 114 to provide the processed data input signal.

At step 604, a first clock signal, a second clock signal, a third clock signal, and a fourth clock signal are generated by a digital clock phase generator circuit. The first clock signal has a first phase. The second clock signal has a second phase that is 90 degrees greater than the first phase. The third clock signal has a third phase that is 180 degrees greater than the first phase. The fourth clock signal has a fourth phase that is 270 degrees greater than the first phase. For example, digital clock phase generator 400 of FIG. 4 may generate first, second, third, and fourth output clock signals 422, 424, 426, and 428.

At step 606, the data input signal is sampled by a digital data slicer based on the first clock signal to provide a first determined value for each bit of the data input signal and by a digital data bar slicer based on the third clock signal to provide a second determined value for each bit of the data input signal. For example, data input signal 114 may be sampled by a digital data slicer using the first clock signal 422 of FIG. 4 to provide a first determined value for each bit of data input signal 114, and data input signal 114 may be sampled by a digital data bar slicer using the third clock signal 426 of FIG. 4 to provide a second determined value for each bit of data input signal 114. The first clock signal (e.g., the first output clock signal 422) controls timing of the digital data slicer. The third clock signal (e.g., the third output clock signal 426) controls timing of the digital data bar slicer.

As shown in FIG. 7, flowchart 700 includes step 702. In step 702, an interpolated clock signal is generated by a digital phase interpolator based on input clock signals that correspond to respective phases of a reference clock. For example, digital phase interpolator 300 may generate interpolated clock signal 332 based on input clock signals that correspond to respective phases of a reference clock (e.g., reference clock 116), as shown in FIG. 3.

Figure 8:
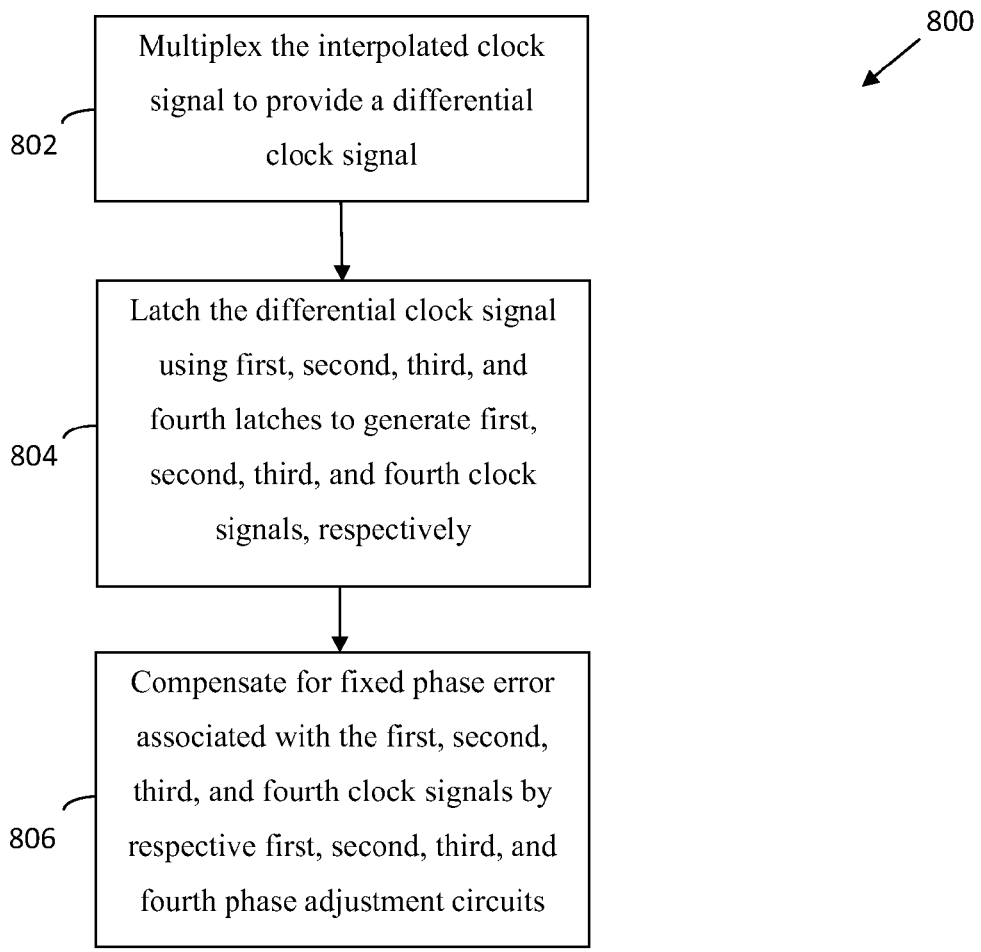
FIG. 8 shows a flowchart of an example method of generating clock signals according to an embodiment.

FIG. 8 shows a flowchart 800 of an example method of generating clock signals according to an embodiment. As shown in FIG. 8, flowchart 800 begins with step 802. In step 802, the interpolated clock signal is multiplexed to provide a differential clock signal. For example, as shown in FIG. 4, interpolated clock signal 332 may be multiplexed to provide a differential clock signal having a first component that corresponds to a phase of 0 degrees of the interpolated clock signal and a second component that corresponds to a phase of 180 degrees of the interpolated clock signal.

At step 804, the differential clock signal is latched using first, second, third, and fourth latches to generate first, second, third, and fourth clock signals, respectively. For example, as shown in FIG. 4, the differential clock signals may be latched by latches 406, 408, 410, and 412 to provide respective first, second, third, and fourth output clock signals 414, 416, 418, and 420.

At step 806, compensation for fixed phase error associated with the first, second, third, and fourth clock signals is performed by respective first, second, third, and fourth phase adjustment circuits. For example, as shown in FIG. 4, first, second, third, and fourth phase adjustment circuits 414, 416, 418, and 420 may compensate for fixed phase error associated with first, second, third, and fourth clock signals 422, 424, 426, and 428, respectively.

Figure 9:
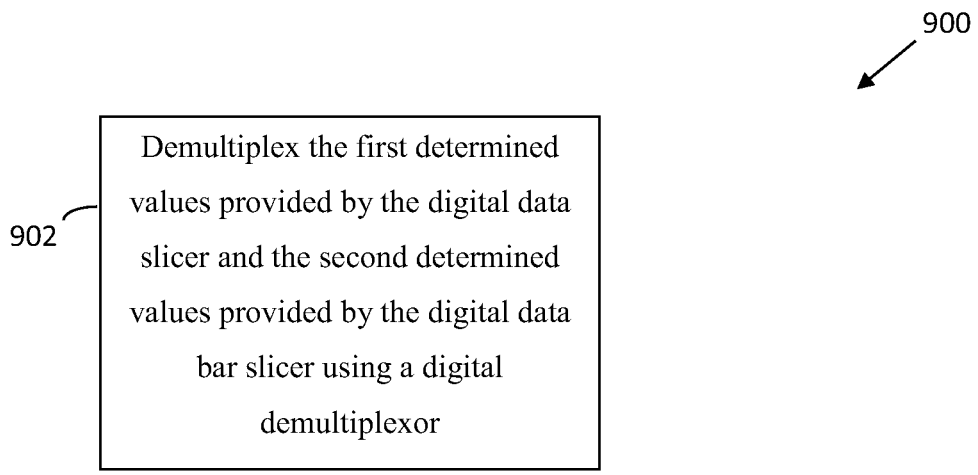
FIG. 9 shows a flowchart of an example method of multiplexing outputs of a digital data slicer and a digital data bar slicer according to an embodiment.

FIG. 9 shows a flowchart 900 of an example method of multiplexing outputs of a digital data slicer and a digital data bar slicer according to an embodiment. As shown in FIG. 9, flowchart 900 includes step 902. In step 902, first determined values provided by the digital data slicer and second determined values provided by the digital data bar slicer are demultiplexed using a digital demultiplexor. For example, outputs of slicers 106 of FIG. 1 may represent first and second determined values provided by a digital data slicer and a digital data bar slicer, respectively, and may be demultiplexed using digital demultiplexor 112.

Figure 10:
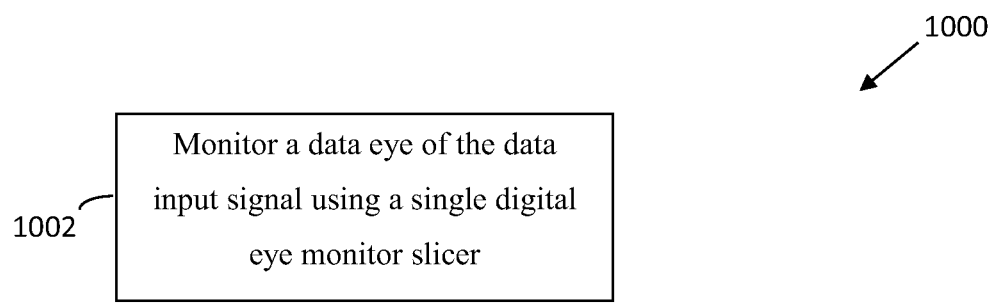
FIGS. 10 and 11 show flowcharts of example methods of monitoring a data eye of a data input signal according to embodiments.
Figure 11:
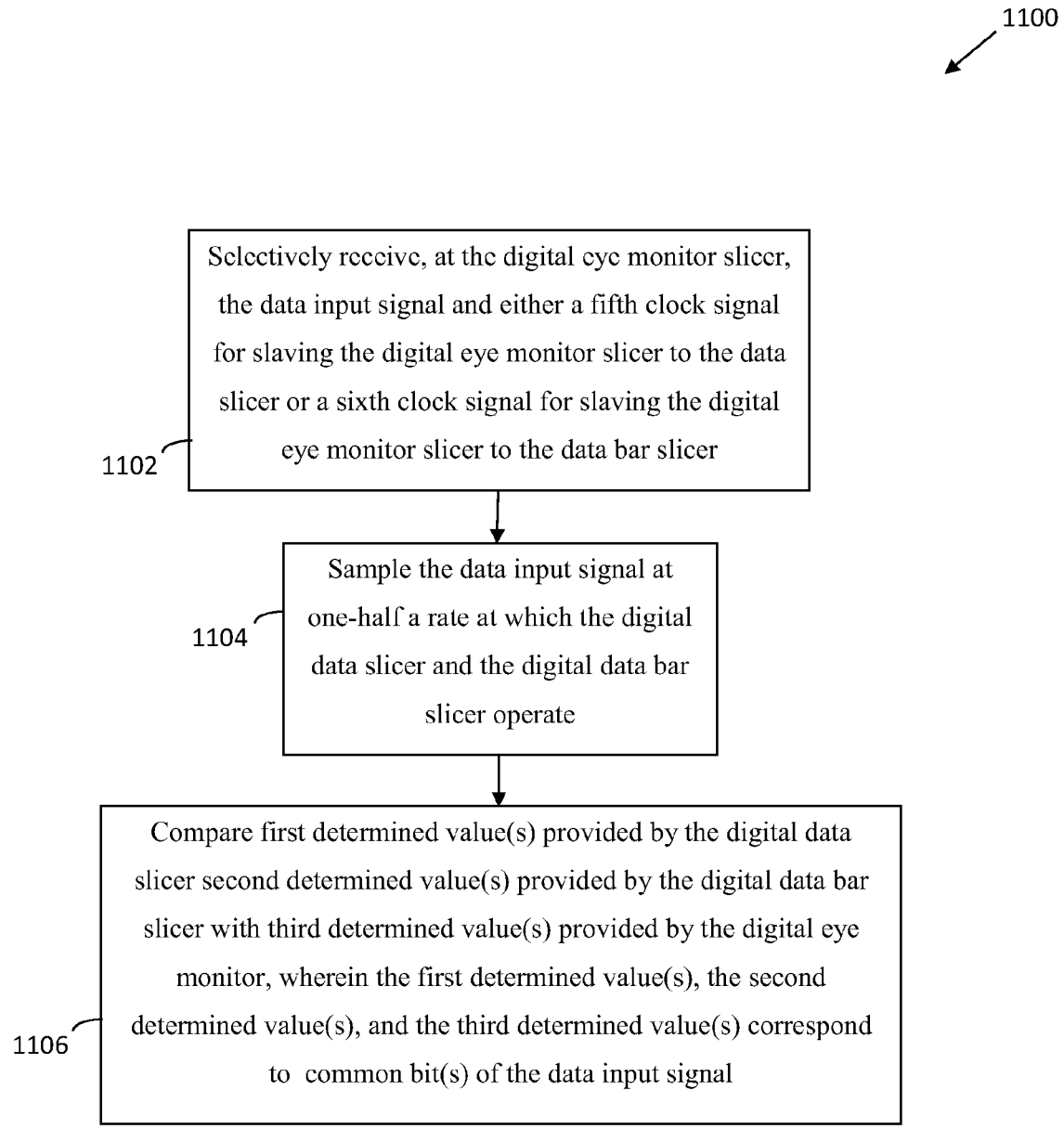

FIGS. 10 and 11 show flowcharts 1000 and 1100 of example methods of monitoring a data eye of a data input signal according to embodiments. As shown in FIG. 10, flowchart 1000 includes step 1002. In step 1002, a data eye of the data input signal is monitored using a single digital eye monitor slicer. For example, a data eye of data input 114 may be monitored using digital eye monitor slicer 506 of FIG. 5.

As shown in FIG. 11, flowchart 1100 begins with step 1102. In step 1102, the data input signal and either a fifth clock signal for slaving the digital eye monitor slicer to the data slicer or a sixth clock for slaving the digital eye monitor slicer to the data bar slicer is selectively received at the digital eye monitor slicer. For example, digital eye monitor 506 of FIG. 5 may receive data input 114 and may selectively receive either a fifth clock signal for slaving digital eye monitor slicer 506 to data slicer 502 or a sixth clock signal for slaving digital eye monitor slicer 506 to data bar slicer 504. In an aspect, the fifth clock signal may have a phase that corresponds to 0 degrees of a second reference signal. In accordance with this aspect, the sixth clock signal may have a phase that corresponds to 180 degrees of the second reference signal. The fifth or sixth clock signal is provided by changing a weighting of digital phase interpolator 510 in FIG. 5.

At step 1104, the data input signal is sampled at one-half a rate at which the digital data slicer and the digital data bar slicer operate. For example, digital eye monitor slicer 506 may be configured to sample data that is sampled by one of digital data slicer 502 or digital data bar slicer 504.

At step 1106, first determined value(s) provided by the digital data slicer or second determined value(s) provided by the digital data bar slicer are compared with third determined value(s) provided by the digital eye monitor. The first determined value(s), the second determined value(s), and the third determined value(s) correspond to common bit(s) of the data input signal.

It will be recognized that the systems, their respective components, and/or the techniques described herein may be implemented in hardware, software, firmware, or any combination thereof, and/or may be implemented as hardware logic/electrical circuitry.

The disclosed technologies can be put into practice using software, firmware, and/or hardware implementations other than those described herein. Any software, firmware, and hardware implementations suitable for performing the functions described herein can be used.

III. Conclusion

While various embodiments have been described above, it should be understood that they have been presented by way of example only, and not limitation. It will be understood by those skilled in the relevant arts) that various changes in form and details may be made to the embodiments described herein without departing from the spirit and scope of the disclosed technologies as defined in the appended claims. Accordingly, the breadth and scope of the disclosed technologies should not be limited by any of the above-described exemplary embodiments, but should be defined only in accordance with the following claims and their equivalents.

What is claimed is:

1. A receiver for a high-speed deserializer comprising:
a plurality of digital slicers configured to determine a digital value of a data input;
a digital phase interpolator configured to generate an interpolated clock signal based on a plurality of input clock signals that correspond to a plurality of respective phases of a reference clock in order to track a phase of the data input to the receiver through a clock recovery loop; and
a digital clock phase generator that receives the interpolated clock signal and is configured to generate a plurality of output clock signals received by the plurality of digital slicers to control timing of the plurality of digital slicers, the plurality of output clock signals based on a plurality of respective phases of the interpolated clock signal.

2. The receiver of claim 1, wherein the plurality of digital slicers comprises:
a data slicer and a data bar slicer configured to determine the digital value of the data input, and
an edge slicer and an edge bar slicer configured to detect an edge of the data input; and
wherein the plurality of output clock signals includes a first output clock signal that is based on a first phase of the interpolated clock signal to control timing of the data slicer, a second output clock signal that is based on a second phase of the interpolated clock signal that is 90 degrees greater than the first phase to control timing of the edge slicer, a third output clock signal that is based on a third phase of the interpolated clock signal that is 180 degrees greater than the first phase to control timing of the data bar slicer, and a fourth output clock signal that is based on a fourth phase of the interpolated clock signal that is 270 degrees greater than the first phase to control timing of the edge bar slicer.

3. The receiver of claim 2, further comprising:
one digital eye monitor configured to monitor a data eye associated with the data input, the digital eye monitor selectively controllable using the first output clock signal and the third output clock signal, the first output clock signal slaving the digital eye monitor to the data slicer, the third output clock signal slaving the digital eye monitor to the data bar slicer.

4. The receiver of claim 3, wherein the digital eye monitor under samples the data input at one-half a rate at which the data slicer and the data bar slicer operate.

5. The receiver of claim 1, wherein each of the plurality of digital slicers comprises:
a respective differential amplifier configured to regenerate a respective differential signal based on the data input;
a respective first latch coupled to the respective differential amplifier and configured to receive the respective differential signal from the respective differential amplifier; and
a respective second latch configured to receive an output of the respective first latch, the respective first and second latches collaboratively providing a respective data output based on the respective differential signal.

6. The receiver of claim 5, wherein each of the plurality of digital slicers further comprises:
a respective connection circuit configured to connect the respective differential amplifier to a positive reference voltage in response to the respective first latch being in an off state.

7. The receiver of claim 5, wherein each of the plurality of digital slicers further comprises:
a respective digital offset calibration circuit configured to provide a respective offset calibration input to the respective differential amplifier to compensate for an offset associated with the respective differential signal; and
a respective proportional to absolute temperature (PTAT) current supply configured to provide a respective PTAT current to the respective differential amplifier to compensate for a temperature dependency associated with the respective offset calibration input.

8. The receiver of claim 7, wherein each digital offset calibration circuit comprises:
a respective variable current source configured to provide a respective offset trimming current; and a respective pair of cascode connected transistors configured to provide the respective offset calibration input.

9. The receiver of claim 1, further comprising a digital de-multiplexor (DEMUX) configured to de-multiplex a plurality of output signals of the plurality of respective digital slicers that are to represent the digital value of the data input.

10. The receiver of claim 1, wherein the plurality of phases of the reference clock includes a 0 degree phase, a 90 degree phase, a 180 degree phase and a 270 degree phase; and
wherein the digital phase interpolator comprises:
a first multiplexor configured to multiplex the input clock signal that corresponds to the 0 degree phase and the input clock signal that corresponds to the 180 degree phase to provide a first multiplexed signal;
a second multiplexor configured to multiplex the input clock signal that corresponds to the 90 degree phase and the input clock signal that corresponds to the 270 degree phase to provide a second multiplexed signal;
a first inverter and a second inverter configured to invert the first multiplexed signal and the second multiplexed signal, respectively, to provide a first inverted signal and a second inverted signal, respectively;
a first programmable slew rate control capacitor configured to control a slew rate of the first inverted signal;
a second programmable slew rate control capacitor configured to control a slew rate of the second inverted signal, the first and second programmable slew rate control capacitors configured to enable the receiver to operate at different frequencies of the data input;
a first plurality of non-linearly weighted adder unit cells and a second plurality of non-linearly weighted adder unit cells coupled to the first programmable slew rate control capacitor and the second programmable slew rate control capacitor, respectively, the first plurality of non-linearly weighted adder unit cells and the second plurality of non-linearly weighted adder unit cells configured to reduce an integral non-linearity and a differential non-linearity associated with the interpolated clock signal; and
a high pass filter configured to reduce a DC offset associated with the interpolated clock signal and to reduce duty cycle distortion associated with the interpolated clock signal.

11. The receiver of claim 1, wherein the digital clock phase generator comprises:
a multiplexor configured to provide a differential clock input based on the interpolated clock signal;
first, second, third, and fourth latches configured to generate first, second, third, and fourth output clock signals of the plurality of output clock signals, the first output clock signal based on a phase of 0 degrees of the interpolated clock signal, the second output clock signal based on a phase of 90 degrees of the interpolated clock signal, the third output clock signal based on a phase of 180 degrees of the interpolated clock signal, and the fourth output clock signal based on a phase of 270 degrees of the interpolated clock signal; and
first, second, third, and fourth phase adjustment circuits configured to compensate for fixed phase error associated with the respective first, second, third, and fourth output clock signals.

12. A quasi-digital receiver for a high-speed deserializer, comprising:
an analog front end configured to amplify and equalize a data input signal;
a plurality of digital slicers configured to determine a value of each bit of a plurality of bits of the data input signal;

a digital de-multiplexor configured to demultiplex an output of each of the plurality of digital slicers;
one digital eye monitor slaved to one of the plurality of digital slicers at a time, the digital eye monitor configured to monitor a data eye of the data input signal;
a digital clock generator configured to generate a plurality of output clock signals to control timing of the plurality of digital slicers; and
a digital phase interpolator configured to generate an interpolated clock signal upon which the plurality of output clock signals is based.

13. The quasi-digital receiver of claim 12, wherein the plurality of digital slicers comprises:
a digital data slicer and a digital data bar slicer configured to determine the value of each bit of the plurality of bits of the data input signal; and
a digital edge slicer and a digital edge bar slicer configured to detect an edge of each bit of the plurality of bits of the data input signal; and
wherein each of the plurality of digital slicers includes a digital offset calibration circuit configured to provide a respective offset calibration input to compensate for a current offset associated with the respective digital slicer.

14. The quasi-digital receiver of claim 13, further comprising:
a proportional to absolute temperature (PTAT) current supply configured to provide a PTAT current to each of the plurality of digital slicers, the PTAT current compensating for a temperature dependency associated with the respective offset calibration input.

15. The quasi-digital receiver of claim 12, wherein the digital phase interpolator comprises:
a programmable capacitor configured to control a slew rate of the interpolated clock signal to enable the receiver to operate over a range of frequencies of the data input signal; and
a high pass filter configured to reduce a DC offset associated with the interpolated clock signal and to reduce duty cycle distortion associated with the interpolated clock signal.

16. A method of providing an interface for receiving and deserializing one or more digital bit streams, the method comprising:
equalizing and amplifying a data input signal that includes a plurality of bits by an analog frontend circuit to provide a processed data input signal;
generating a first clock signal having a first phase, a second clock signal having a second phase that is 90 degrees greater than the first phase, a third clock signal having a third phase that is 180 degrees greater than the first phase, and a fourth clock signal having a fourth phase that is 270 degrees greater than the first phase by a digital clock phase generator circuit; and
sampling the data input signal by a digital data slicer based on the first clock signal to provide a first determined value for each bit of the plurality of bits of the data input signal and by a digital data bar slicer based on the third clock signal to provide a second determined value for each bit of the plurality of bits of the data input signal, the first clock signal controlling timing of the digital data slicer, the third clock controlling timing of the digital data bar slicer.

17. The method of claim 16, further comprising:
generating an interpolated clock signal by a digital phase interpolator based on a plurality of input clock signals that correspond to a plurality of respective phases of a reference clock;
wherein generating the first, second, third, and fourth clock signals comprises:
multiplexing the interpolated clock signal to provide a differential clock signal;
latching the differential clock signal using first, second, third, and fourth latches to generate the first, second, third, and fourth clock signals, respectively; and
compensating for fixed phase error associated with the first, second, third, and fourth clock signals by respective first, second, third, and fourth phase adjustment circuits.

18. The method of claim 16, further comprising:
demultiplexing the first determined values provided by the digital data slicer and the second determined values provided by the digital data bar slicer using a digital demultiplexor.

19. The method of claim 16, further comprising:
monitoring a data eye of the data input signal using a single digital eye monitor slicer.

20. The method of claim 19, wherein monitoring the data eye of the data input signal comprises:
selectively receiving, at the digital eye monitor slicer, the data input signal and either a fifth clock signal for slaving the digital eye monitor slicer to the data slicer or a sixth clock signal for slaving the digital eye monitor slicer to the data bar slicer;
sampling the data input signal at one-half a rate at which the digital data slicer and the digital data bar slicer operate; and
comparing at least one first determined value provided by the digital data slicer or at least one second determined value provided by the digital data bar slicer with at least one third determined value provided by the digital eye monitor in response to sampling the data input signal; and
wherein the at least one first determined value, the at least one second determined value, and the at least one third determined value correspond to a common at least one bit of the plurality of bits of the data input signal.

* * * * *